United States Patent [19]

Larkin

[11] 4,428,362
[45] Jan. 31, 1984

[54] SOLAR HEATING SYSTEM

[76] Inventor: William J. Larkin, 12698 Morgan La., Garden Grove, Calif. 92684

[21] Appl. No.: 224,141

[22] Filed: Jan. 12, 1981

[51] Int. Cl.³ .............................................. F24J 3/02
[52] U.S. Cl. .................................... 126/434; 126/437; 126/448
[58] Field of Search ................. 126/434, 437, 448, 433

[56] References Cited

U.S. PATENT DOCUMENTS 3,919,998 11/1975 Parker ................................. 126/433
4,126,122 11/1978 Bross .................................. 126/437

FOREIGN PATENT DOCUMENTS 272027 7/1965 Australia ............................ 126/434
5533562 8/1980 Japan ................................. 126/434

*Primary Examiner*—Edward G. Favors
*Assistant Examiner*—Henry Bennett

[57] ABSTRACT

A solar heating system is provided incorporating the flat plate collector and storage tanks substantially in the same unit and avoiding the usual reverse-siphon problems that are inherent in the nature of a passive integral system of this type by a piping system wherein heating and elevation of certain vertical components of connecting piping reverses, or almost reverses, the usual net pressure head which is responsible for creating the reverse siphon.

6 Claims, 9 Drawing Figures

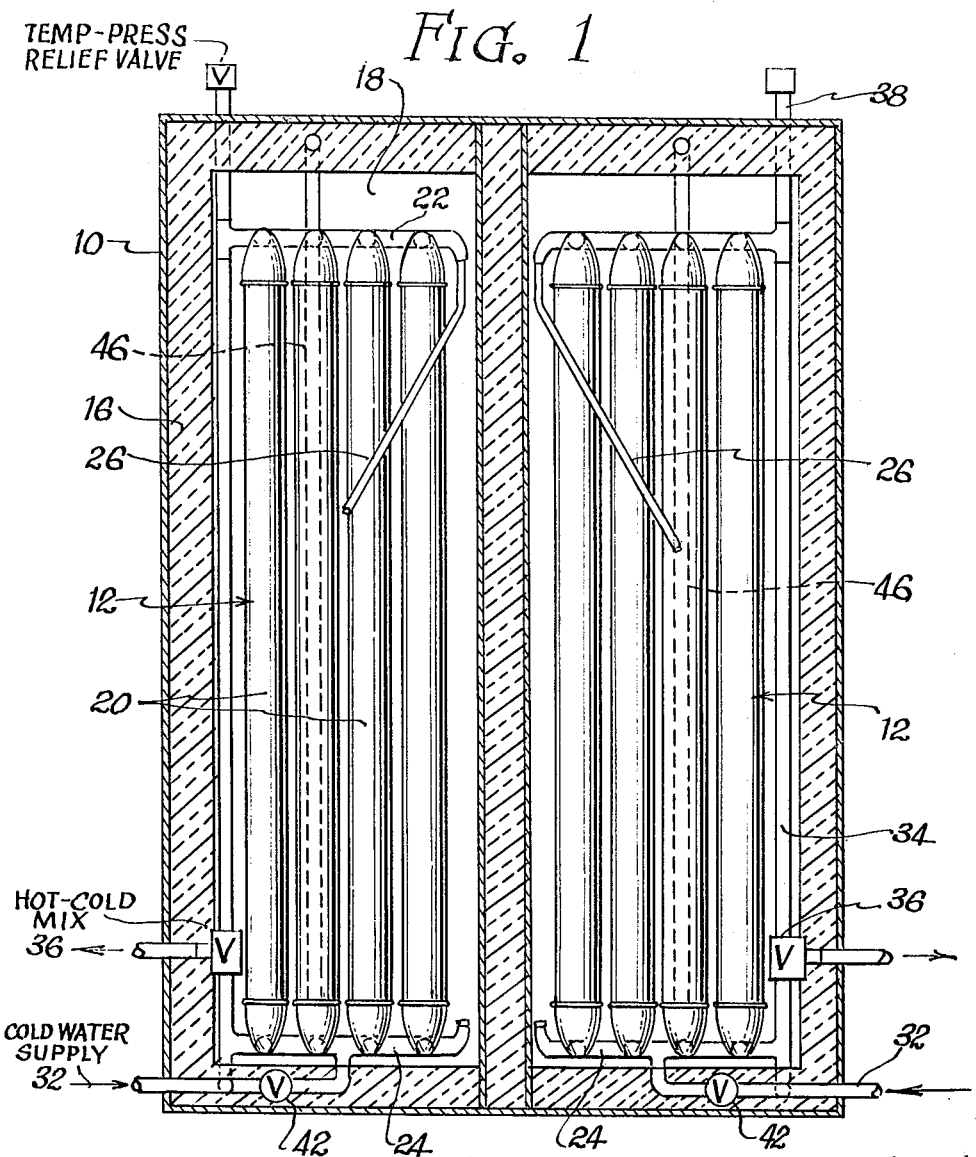
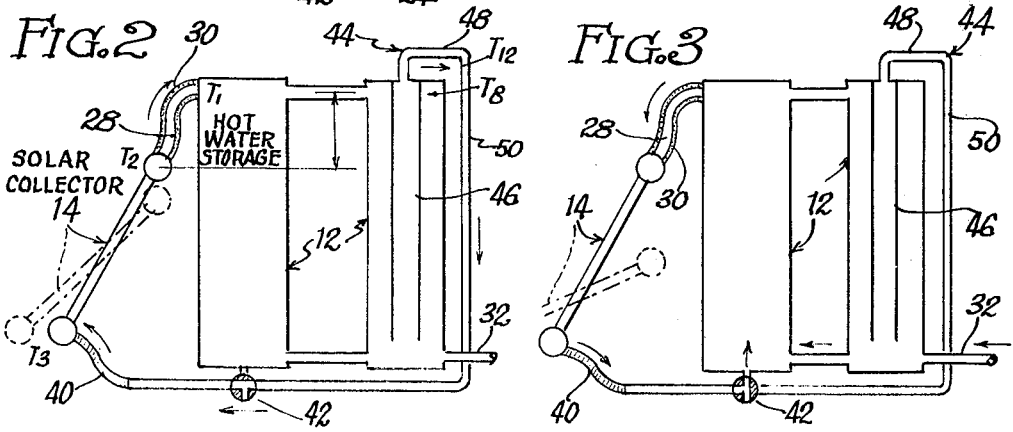

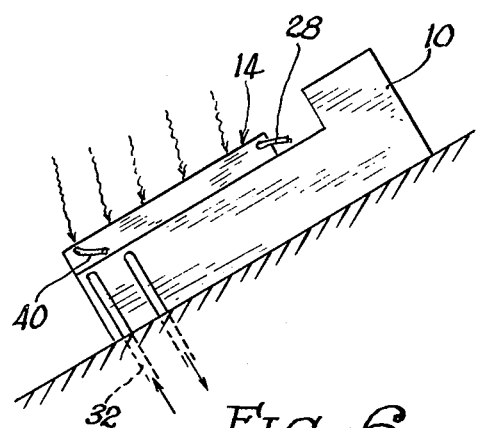
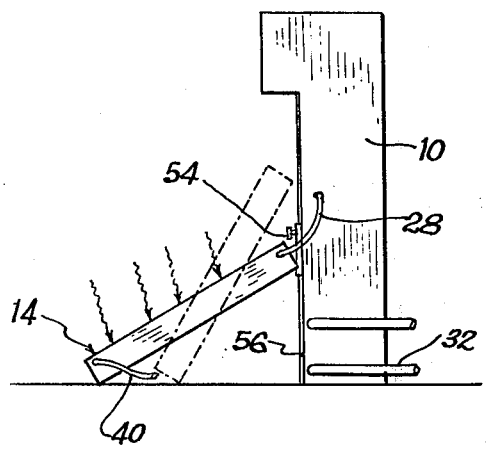
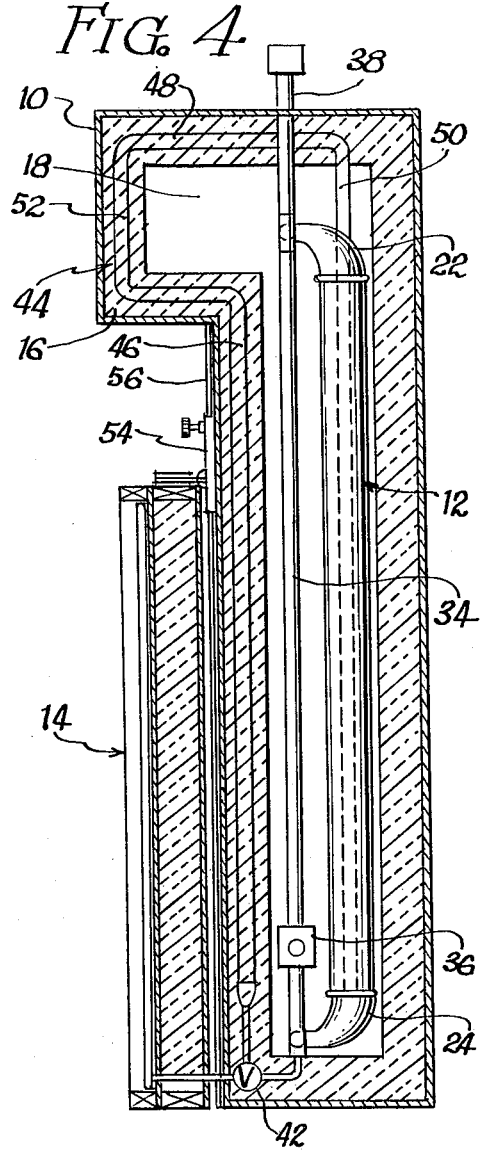
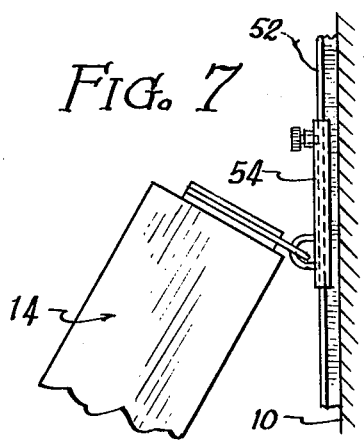
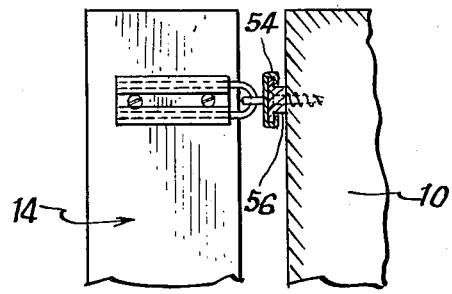

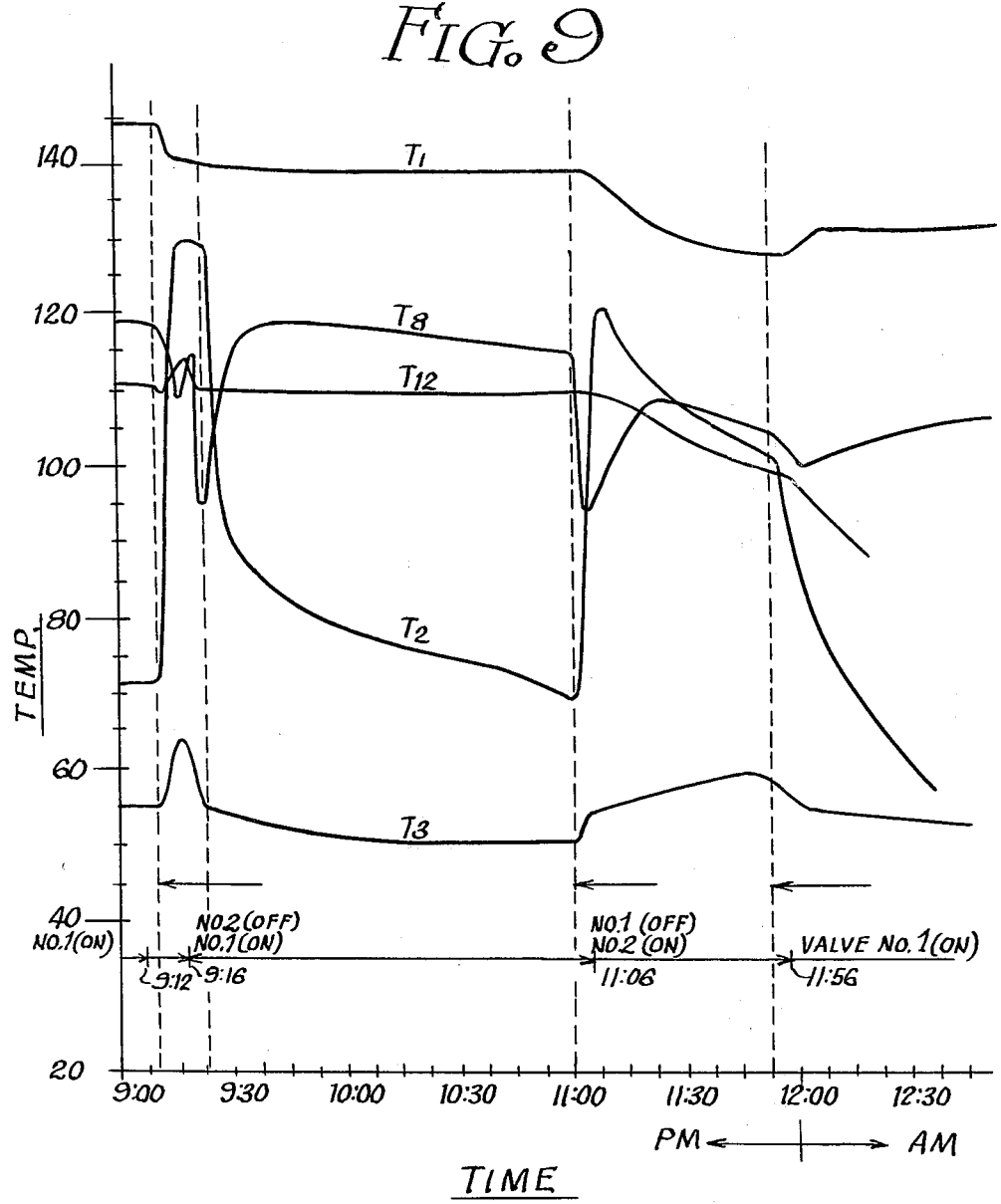

SOLAR HEATING SYSTEM

BACKGROUND OF THE INVENTION

Flat plate solar collectors are generally the most economical, simple and practical means of converting solar energy into heated water or other fluid. The simplest types of flat plate collector systems are those which operate on the so-called thermosiphon, wherein the bottom of the hot water storage tank is positioned vertically higher than the solar collector causing an automatic circulation of hot water from the collector up to the storage tank. Naturally, at night when the solar collector becomes quite cool because of its radiant properties, the cool water will remain in the collector and not be circulated into the hot water tank due to the elevational positioning of the two units. Proper functioning of the thermosiphon flat plate collector system requires positioning of the hot water storage tank above the collector, and thus an unsuitably large unit is required, or two separate units are required with suitable interconnecting plumbing that create greater expense for materials and installation than if the collector and storage tank could be efficiently packaged as a single unit.

Considerable effort and research has gone into the creation of a unit which will thermosiphon efficiently in the proper direction with the hot water storage tank positioned behind the collector panel. The main area addressed in the research was that of efficiently preventing reverse-siphoning of the unit at night so the hot water stored in the tank from the unit's daytime operation wouldn't be cooled. In essence, because the hot water tank is no longer elevated above the collector, in the evening and during other cold weather periods cool water in the collector will cause reverse-siphoning of the system, gradually filling the hot water tank up from the bottom with water which has been drawn from the top of the hot water tank, cooled in the collector which is now radiating heat, and then introduced as cooled water in the bottom of the hot water tank. This reversing-siphoning is precisely the system one would want if utilizing the stored water for space cooling in the daytime and operating the system at night. However, this is not ordinarily the case.

The reverse-siphoning difficulty cannot be resolved by putting in an ordinary check valve, because the flow forces are so minute that forward siphoning cannot be inhibited even to the extent of overcoming a check valve flap. Thus, research has turned toward the development of an effective, "thermic diode", which is simply a suitable check valve device that will stop or inhibit reverse flow and not substantially hinder forward flow.

A thoroughly effective and simple for achieving this and one with which the instant inventor has knowledge, utilizes a chamber having an immiscible fluid floated on top of the working fluid of the system. A stub pipe extends to approximately the inter-liquid surface to provide for the flow of water in the forward direction out of the pipe. It requires a minute amount of energy for forward flow because the oil or other fluid floating atop the working fluid is of a very slightly different specific gravity and is very easily raised a small fraction of an inch for the introduction of working fluid past the floating oil. However, if the system attempts to reverse-flow, it draws an increasingly long column of oil vertically down into the stub pipe, causing an increasingly negative pressure head in this pipe, eventually causing a neutral net pressure head in the entire system which stops the flow. This might work, but only if the descending pipe is insulated.

Although the floating oil technique is effective, it is naturally somewhat delicate in its parameters and is not necessarily adapted to being slung around by workmen and installed at haphazard angles on roofs of varying slopes and, therefore, while providing a definite step forward in the art of integral flat plate collector systems, does not provide a fail-safe, rugged system that can withstand a considerable amount of abuse and installation at any angle and still function properly.

SUMMARY OF THE INVENTION

The present invention provides such rugged and versatile capability as last described above through use of a piping arrangement whereby vertical components of connecting piping between the collector and the tank cause non-characteristic thermal properties by warming portions of the system fluid which would otherwise be cool, thus affecting the net pressure head across the collector such as to cause it to remain zero, or even become slightly negative as it cools.

Specifically, in the ordinary closed circuit system of the simplest type of collector plate-storage tank system, the top of the collector plate connects to the top of the storage tank, and the bottoms are similarly connected together. In the instant invention, however, the bottom of the collector plate does not connect directly to the hot water storage tank, but instead passes through a vertical loop having an ascending portion which is open at the bottom of part of the hot water storage tank and which rises to the top of this tank, wherein a descending portion continues around to the bottom of the flat plate collector. By thus inserting the cool water return line into the hot water tank, the ascending portion of this loop which would ordinarily neutralize the descending portion if the temperatures were the same, in fact, will contain much warmer water having a substantially lower pressure head, thus resisting the reversal of flow in the system which would cause this warmer water to be lowered and relatively cooler water in the descending portion of the vertical loop to be raised.

BRIEF DESCRIPTION OF THE DRAWINGS

FIG. 1 is a front elevation view of a double system utilized for testing and having portions cut away;

FIG. 2 is a diagrammatic view of the system showing temperature plotting points with the anti-reverse siphon system in operation;

FIG. 3 is a diagrammatic view of the system showing the anti-siphon system by-passed;

FIG. 4 is a section taken through the system;

FIG. 5 illustrates the system deployed on a rooftop;

FIGS. 6, 7 and 8 illustrate details of construction permitting angular adjustment of the flat plate collector; and FIG. 9 is a graph made during actual testing wherein the temperature plot points indicated in FIG. 2 are in fact plotted.

DETAILED DESCRIPTION OF THE PREFERRED EMBODIMENT

FIG. 1 illustrates a dual system with the front cut away to disclose the tank system. This system is dual to enable the generation of comparative test results. However, the system need not be implemented as two separate subsystems beyond the experimental stage. This description will treat a single system accordingly.

The rear portion of the system is housed in a rigid casing 10 which contains a hot water tank 12 and associated plumbing. Forward of the hot water tank casing, in the illustrated embodiment, is disposed the flat plate collector 14. The flat plate collector could be built into the casing 10, provided, of course, the front is not covered, but was implemented as a generally separate unit in the embodiment shown strictly for purposes of permitting the variation of the angle of the collector to the horizontal for testing.

Inside the casing 10 is a layer of insulation 16 inside of which is a cavity 18 in which the hot water tank 12 rests. This hot water tank is shown as four component cylindrical tanks 20, the purpose of this construction being two fold. First, the cylindrical construction is more capable of withstanding the household water pressure under which the system is intended to operate, and second, subdividing the tank into vertical sub tanks expedites the maintenance of temperature stratification, the need for which will become apparent below.

These tanks are coupled together with upper and lower manifolds 22 and 24, respectively, manifold 22 being connected via connector pipe 26 to the collector hot water delivery pipe 28, which is insulated, as is seen in FIGS. 2 and 3, where the insullation is indicated at 30. The bottom manifold 24 connects with fresh water supply as shown at 32, and a mixing pipe 34 makes available through mixing valve 36 a hot water supply which may have to be diluted somewhat with cold water, depending on weather conditions. The mixing pipe 34 connectes through a short standpipe to a pressure release valve 38 in the event conditions create a dangerously high pressure in the system.

A thermosiphon flat plate ordinarily connects to the hot water tank at its top and at its bottom and creates a continuous circulation. In the instant system, thhe top of the flat plate connects to the top of the hot water tank through the lines 26 and 28, already mentioned, but the bottom of the flat plate collector is not directly connected to the bottom of the storage tank system. Instead, a flexible line (in the experimental model) communicates through a valve 42 to a vertical loop 44 (which may not actually be completely vertical but will be referred to as such) this loop containing an ascending standpipe portion 46, an upper loop 48, and a descending portion 50 which connects at its bottom to the valve 42. The bottom of the ascending part of the pipe 46 is open and communicates with the bottom part of the tank, adjacent the manifold 24.

For purposes of a simple explanation, FIGS. 2 and 3 are a diagrammatic illustration of the connection of the parts and do not conform precisely to the engineering details incorporated to a greater extent in the other figures. Basically, the system described above functions as follows. Referring to FIGS. 2 and 3, when the collector 14 (which could be any suitable type of collector) is operative in the sunlight, circulation is up through the collector and into the top of the hot water storage tank. The general idea here is that the hottest, freshest water is introduced into the top portion of the tank, forcing down water that had been in the tank somewhat longer so that a temperature stratification is achieved in the tank with the colder water being at the bottom. This stratification should be fairly uniform all the way from bottom to top, and ordinarily as the hot water on the top of the tank forces the cold water down, it is forced back into the bottom solar collector where the cycle repeats.

During the positive cycle, this system is substantially retained except that instead of the cold water coming directly from the bottom of the storage tank, it passes up through ascending pipe segment 46, through the loop 48, and down through the descending standpipe 50 where it communicates through line 40 to the bottom of the collector. During the positive cycle the operation remains generally unchanged, except that the cold water has a little further to go. Because the forward cycling of the unit is fairly fast relative to reverse-siphoning, the cold water drawn upwardly through the ascending standpipe 46 is not disposed within the hot water tank long enough to rise completely to the temperature in the tank. Thus, although the increase in temperature may slow down the forward cycling somewhat, the much greater heat experienced in the solar collector and the hot water delivery pipe 28 easily cause the forward cycling of the unit.

At night, however, the situation is entirely different. The solar collector 14 cools, and ordinarily causes a reverse-siphoning action which draws hot water from the top of the storage tank through line 28 where it is cooled in the collector, very rapidly, inasmuch as the collector was designed to be an efficient temperature device, and then passes down to the bottom of the hot water tank. However, due to the presence of the vertical loop 44, this reverse cycling will not occur because the pressure heads have been modified by the insertion of the ascending standpipe 46 inside the hot water tank. Thus, when the water attempts to reverse-siphon, it is opposed by the cold water (high density head) in the descending standpipe 50, which is not cancelled, as it ordinarily would be, by another high density head in the ascending pipe 46, because this pipe, being disposed in the hot water tank, has a low density head which resists being pushed down just as the descending pipe 50 resists upward movement.

Under different temperature conditions of course, it may be more or less difficult to stop, or substantially inhibit, reverse-siphoning. Ordinarily, however, the greater in height difference between the top of the collector and the loop 44, the greater the resistance to backflow. For this reason, the loop 44 is provided in the preferred embodiment with a forward lobe 52 seen in FIG. 4 so that when the device is inclined rearwardly, the top of the loop still has a substantial height advantage over the top of the collector plate.

The valve 42, which connects the bottom of the collector to the vertical loop, also can be switched as shown in FIG. 3 to connect the bottom of the collector directly to the bottom of the hot water tank as with the conventional unit. This was done with two valves in the model, and over a period of time, with the water being maintained warm in the tank by artificial means, these valves were reversed to alternately provide the effect of either a conventional flat plate collector system, or the instant system using the vertical loop 44.

As can be seen in FIG. 9, the temperatures taken at the places indicated in FIG. 2 were graphed over several hours. At 9 o'clock when the unit was first monitored, the new system was connected and it can be seen that the temperatures remained fairly steady at all four of the temperature points. At 9:12, the new system was by-passed and the old system connected with the drastic results indicated on the graph. Temperature T-1 dropped off rather rapidly, indicating some flow of water. Temperature T-2, which is probably the most sensitive and telling temperature point of the whole system, skyrocketed immediately, indicating a surge of hot water from the top of the tank down toward the collector, clearly indicative of reverse-cycling. Temperature 3 naturally experienced a smaller jump because of the radiant heat loss experienced as the water passes through the collector, and temperatures T-8 and T-12 also exhibit radical behavior associated with reverse-siphoning.

A few minutes later, the new system was again switched back into the circuit and it can be seen that temperature T-2 again drastically falls, clearly indicating a slow down and possibly a complete stoppage of backflow from the top of the hot water tank. Temperature T-3 also slowed down, and temperature T-8 stabilized to a slowly declining state characteristic of there being no water movement and only slight relative and convection losses of heat of the ambient atmosphere.

At 11 o'clock, once again the systems were reversed, and again the characteristic dramatic leap of temperature T-2 and the falling off of temperature T-1 indicate that backflow has resumed with vigor. Again the situation is reversed just prior to midnight, when the new system is switched back on line.

Therefore, it is clear that the system represents a definite inhibition to backflow. It is likely that a very slight flow would still continue, representing the gradual cooling of the water inside insulated pipe 28 and the possible passage of heat by convection from the top of the tank around a portion of the vertical loop 44. However, such very slight reverse movement might be successful in preventing the freezing of water in the collector, which would readily happen in absolute dead water conditions within the collector at a temperature only slightly below freezing. However, the large, counterproductive heat losses experienced in the conventional reverse-siphoning systems have been eliminated.

A mechanical detail which should be pointed out which will prove useful in further experimental models is the slide 54 which engages on track 56 on the front of the casing 10 to permit the flat plate to achieve one of several angles relative to the horizontal as indicated in FIG. 6.

The essence of the invention is, of course, the contacting of a portion of the plumbing system with the hot water tank to unbalance the usual pressure head equation which leads to reverse flow, aided by the extension above the top of the flat plate of the vertical loop 44.

Calculations approximating the pressure heads in the various vertical components of the plumbing system, taking into account the length of vertical component and the average temperature within the pipe, indicate that for normal temperature conditions, provided the vertical loop 44 extends sufficiently high above the top of the flat plate collector, the system will indeed work substantially as empirically determined by the graphs of FIG. 9. Naturally, certain modifications of the plumbing system, and arrangements of the heating tank relative to the vertical loop and other plumbing but which ahieve the same result indicated in this disclosure should fall within the ambit of the appended claims.

What is claimed is:

1. An anti-reverse-siphon solar collector system comprising:
   (a) a hot water storage tank;
   (b) a flat plate collector communicating at the top with an upper portion of said tank and being disposed at substantially the same heights as said tank;
   (c) a cold water supply line having a delivery end connected to the bottom of said collector and a source end communicating with a water source;
   (d) said supply line including an upright loop with substantial vertical components including ascending and descending standpipe portions wherein in normal solar operation the ascending portion is upstream from, and ushers water into, said descending portion; and
   (e) said descending standpipe portion having its highest point on the order of a foot higher than the top of said collector and being thermally insulated from said tank and said collector, and said ascending portion descending from its juncture with said descending portion down into said tank from the top extending into communication with a lower portion thereof, causing a temperature differential in said standpipe portions such that said ascending portion is maintained warmer than said descending portion causing an anti-backflow pressure head to develop to counter creeping backflow in said system due to cooling of said collector.

2. An anti-reverse-siphon solar collector system comprising:
   (a) a hot water storage tank;
   (b) flat plate collector communicating at the top with an upper portion of said tank;
   (c) a cold water supply line having a delivery end connected to the bottom of said collector and a source end communicating with a water source;
   (d) said supply line including an upright loop with substantial vertical components including ascending and descending standpipe portions;
   (e) means causing a temperature differential in said standpipe portions such that said ascending portion is maintained warmer than said descending portion causing an anti-backflow pressure head to develop to counter creeping backflow in said system due to cooling of said collector; and
   (f) a valve by-pass line directly connecting the bottom of said flat plate collector in the bottom of said tank to circumvent said upright loop.

3. Structure according to claim 1 wherein said tank has a fresh water inlet at the bottom thereof and said ascending standpipe section extends down through said tank and terminates open-ended adjacent said inlet and communicating therewith.

4. Structure according to claim 3 wherein said tank is divided into a plurality of generally upright parallel side by side, substantially identical cylinders and said ascending section extends nto one of said cylinders.

5. Structure according to claim 1 wherein said ascending portion extends inside said tank into contact with the hot water therein, and the uppermost portion of said ascending portion in such contact is higher than the uppermost portion of said flat plate collector.

6. Structure according to claim 1 wherein said loop includes a forwardly projecting lobe to establish a vertical component less susceptible to loss of vertical height by virtue of reclining said tank rearwardly.

* * * * *